(12) United States Patent
Nagaraj et al.

(10) Patent No.: US 9,647,588 B2
(45) Date of Patent: May 9, 2017

(54) DECAY LOCK LOOP FOR TIME VARYING CURRENT REGULATION IN ELECTRIC MOTORS

(71) Applicant: Texas Instruments Incorporated, Dallas, TX (US)

(72) Inventors: Sudhir Nagaraj, Dallas, TX (US); David H. Elwart, II, Sachse, TX (US); Rakesh Raja, Allen, TX (US); Anuj Jain, Lewisville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/984,834

(22) Filed: Dec. 30, 2015

(65) Prior Publication Data

US 2016/0254767 A1     Sep. 1, 2016

Related U.S. Application Data

(60) Provisional application No. 62/121,368, filed on Feb. 26, 2015.

(51) Int. Cl.
    *H02P 8/00*       (2006.01)
    *H02P 8/12*       (2006.01)

(52) U.S. Cl.
    CPC .................................. *H02P 8/12* (2013.01)

(58) Field of Classification Search
    CPC .. H02P 6/14; H02P 23/00; H02P 25/00; H02P 7/00; H02P 27/04; H02P 27/06; H02P 8/00; H02P 8/02; H02P 8/12; H02P 8/22; H02P 6/00

USPC .... 318/400.01, 400.14, 400.15, 400.32, 700, 318/701, 721, 779, 799, 800, 801, 400.21, 318/400.22, 685, 696; 363/40, 44, 95, 363/120, 174, 175

See application file for complete search history.

(56) References Cited

U.S. PATENT DOCUMENTS

| | | | |
|---|---|---|---|
| 8,659,259 B2* | 2/2014 | Suda | H02P 8/12 318/696 |
| 2011/0057600 A1* | 3/2011 | Suda | H02P 8/12 318/696 |

* cited by examiner

*Primary Examiner* — Antony M Paul
(74) *Attorney, Agent, or Firm* — Lawrence J. Bassuk; Charles A. Brill; Frank D. Cimino (57) ABSTRACT

A system and method for a decay lock loop for time varying current regulation in electric motors determines if a predetermined electrical current regulation level for an electric motor has been obtained within a tuning control time window. A coarse control loop increases or decreases a fast current decay, in response to a determination that the predetermined electrical current regulation level has not been obtained within the tuning control time window, until the predetermined electrical current regulation level falls within the tuning control time window. A fine control loop increments or decrements an amount of fast current decay during a total decay time, in response to a determination that the predetermined electrical current regulation level has been obtained within the tuning control time window, until a predetermined timing of the predetermined electrical current regulation level has been obtained.

20 Claims, 9 Drawing Sheets

DECAY LOCK LOOP FOR TIME VARYING CURRENT REGULATION IN ELECTRIC MOTORS

CROSS-REFERENCE TO RELATED APPLICATION

This application claims the benefit of U.S. Provisional Patent Application Ser. No. 62/121,368, entitled Decay Lock Loop for Time Varying Current Regulation in Motor Applications, filed Feb. 26, 2015, which is incorporated herein by reference.

BACKGROUND

In motor applications it may be suitable to control the current energizing the motor winding(s). This current control may be used to limit the max current, produce a specific current less than the max value, or to produce a specific current profile over time. There are many different types of motors, brushed DC, brushless DC, induction, linear induction, linear synchronous, stepper, etc.

Stepper motors are very common in applications needing position control without requiring feedback sensors (open loop control). ATMs, surveillance cameras, printers, scanners, robotics and office automation are some such applications using stepper motors. A stepper motor has electromagnets (windings) that control its movement. To make the motor shaft turn, the electromagnets are energized in a controlled manner using a driver, or the like, which may be an Integrated Circuit (IC), or the like.

In a four-magnet stepper motor a first electromagnet is turned on, attracting the nearest teeth of a gear-shaped iron rotor. With the teeth aligned to this first electromagnet; they will be slightly offset from a second electromagnet. The first electromagnet is then turned off, and the second electromagnet is energized, pulling the teeth into alignment with it. This results in rotation, typically on the the order of a few degrees. A third electromagnet may then be energized and another rotation of the same magnitude occurs, and then the fourth electromagnet is energized for an addition rotation of the same amount. When the first electromagnet is again enabled, the rotor will have rotated by one tooth position. Hence, such a four magnet stepper motor may rotate a full rotation in a number of steps equal to four times the number of teeth on the rotor. To have smother motion, more teeth may be added, making each step have a smaller arc length. This approach to smoother higher quality motion is costly and has a physical limit with respect to teeth size and production practicalities.

However, in micro-stepping, instead of increasing the number of teeth, orthogonal electrical fields are ratioed (i.e. modified or multiplied by a ratio) to produce a vector sum of forces producing a stable location in-between full steps of the teeth. This is implemented using micro-stepping drivers. Therein time domain currents for orthogonal motor electromagnets windings (coil) are controlled to produce sinusoidal profiles that are ninety degrees out of phase. Each step is associated with a certain amount of current through each electromagnet coil and results in a particular position of the motor. With each step, the current profile advances to the next step making the motor move to the next step. At any point in time the magnitude of the currents will produce a vector sum on a one hundred percent constant torque circle, such that within every full step/tooth the motion may be broken down into equal portions of smaller steps. Within each discrete step of holding current the coil current must be regulated to the specific value.

Pulse Width Modulation (PWM) chopping may be used for current regulation. An H-bridge consisting of a number of Laterally Diffused Metal Oxide Semiconductor (LDMOS) transistors may be used for switching a power supply into and out of the circuit controlling the stepper motor by the nature of a low impedance path or high impedance path through a switch employed for driving a motor winding. Each coil is usually driven by an H-bridge circuit. During drive, a high side FET (i.e. LDMOS transistor) on one side of the coil and a low side FET on the other side of the coil are turned on. If a method for stopping the current from building in the coil is not employed, the driver IC and motor will likely be damaged. The method used is commonly referred to as decaying the current, or recirculation of the current. There are three implementations of decay, fast decay, slow decay and mixed decay. Fast decay is placing an opposing polarity voltage across the winding (i.e. reversing the voltage across the coil). This results in a current decay rate which is the same as the charge rate for the coil. Allowing the current to flow into two low-side transistors (i.e. the current is recirculated using two low side FETs) is referred to as slow decay, which results in a slower decay rate than fast decay. Both fast and slow decay may be used in the same cycle, which is then referred to as mixed decay. For example, when a desired regulation current is reached, first fast decay may be performed, followed by slow decay.

A motor system has many different variables contributing to making the correct decay scheme vary, system to system. When a system integrates a new motor, motor driver, or both into their application it must be tuned to apply the correct decay scheme, such as by observing the current profile on an oscilloscope. This may be a tedious, time consuming, difficult process, requiring particular skills and/or training, particularly where multiple-sourcing may be employed for motor system components. For example, the correct decay settings may depend own individual motor load, supply voltage, PWM frequency, current being sourced, speed of rotation, back electromotive force (BEMF), etc. Depending on such factors, some tradeoffs are also present when attempting to derive a decay scheme that will satisfy all currents (low currents and peak currents). For example, the decay mode that is best for reducing ripple is not the best decay scheme to regulate small currents. When one decay mode is selected, the setting may become suboptimal as the situation changes (e.g. battery supply lowers, motor characteristics change, step frequency changes, etc.).

Slow decay is typically not good for regulating low levels of current. Often, the slow decay rate cannot discharge the current built up during a minimum motor on time, resulting in current run-off. Fast decay is preferred for this case. However, while regulating larger current, fast decay results in larger ripple due to the charge/discharge rate being the same. For fast step response, fast decay is typically preferred. However, once a holding current is reached, undershoot and larger ripple may result. Slow decay is preferred for reducing ripple but results in longer step response time.

For battery-powered applications in particular, initial decay settings may become sub-optimal as supply voltage droops. As a motor ages and becomes more resistive, initial decay setting will need to be adjusted. Fixed decay schemes typically cannot handle BEMF well and may result in repeated patterns in current regulation that fall in the audible frequency range leading to noisy motor operation. Slow decay setting is more efficient but has drawbacks of longer step response, inability to hold low current, etc. Fast decay solves these problems but is less efficient due to switching losses and has more ripple. Insufficient decay may be provided at low currents, resulting in loss of current regulation and increased harmonic distortion, or correct decay at low currents may result in far too much decay at higher currents. Hence, typical fixed decay schemes characteristically arrive at a non-optimized solution for all factors involved in motor control.

SUMMARY

Embodiments of the preset disclosure provide a decay lock loop for time varying current regulation in an electric motor that includes determining if a predetermined electrical current regulation level for an electric motor has been obtained within a tuning control time window. This may include determining if the predetermined electrical current regulation level has been obtained outside the tuning control time window. The tuning control window may extend from an end of a minimum drive time window.

In response to a determination that the predetermined electrical current regulation level has not been obtained within the tuning control time window, fast current decay is increased or decreased until the predetermined electrical current regulation level falls within the tuning control time window. Increasing or decreasing the fast current decay correspondingly reduces or increases slow current decay. Increasing or decreasing the fast current decay may include progressively increasing or decreasing more aggressive ratios of fast current decay to slow current decay until the predetermined electrical current regulation level occurs within the tuning control time window.

However, in response to a determination that the predetermined electrical current regulation level has been obtained within the tuning control time window, the amount of fast current decay is incremented or decremented during a total decay time, until a predetermined timing of the predetermined electrical current regulation level has been obtained. Incrementing or decrementing the amount of fast current decay during the total decay correspondingly decrements or increments slow current decay during the total decay time. Further, in response to a disruption of the timing of the predetermined electrical current regulation level, the fast current decay may be incremented or decremented the during the total decay time until the predetermined timing of the predetermined electrical current regulation level has been re-obtained.

In particular, aspects for incrementing or decrementing an amount of fast current decay until a predetermined timing of the predetermined electrical current regulation level has been obtained further may include determining if the predetermined timing of the predetermined electrical current regulation level has been obtained in a center of the tuning control time window. Wherein, the amount of fast current decay may be incremented or decremented during the total decay time for the electric motor, until the predetermined electrical current regulation level has been obtained in a center of the tuning control time window. More specifically in certain aspects, it may be determined if the predetermined electrical current regulation level has been obtained before, after or at a center of the tuning control time window. Whereupon, the amount of fast current decay is incremented during the total decay time for the electric motor if the predetermined electrical current regulation level has been obtained before the center of the tuning control time window, and the amount of fast current decay may be decremented during the total decay time for the electric motor if the predetermined electrical current regulation level has been obtained before the center of the tuning control time window.

Hence, an electric motor regulation device for decay lock loop in time varying current regulation in an electric motor may have an input configured to receive input defining the tuning control time window size. The device may have a digital core, or the like configured to receive the input defining the tuning control time window size and may be configured to output coarse control loop settings to a coarse control loop logic, output fine control loop settings to a fine control loop logic, and output a reference predetermined electrical current, all of which may be based on the tuning control time window size.

The coarse control loop logic may be configured to receive the coarse control loop settings and a comparison of the reference predetermined electrical current and a sense signal received from a driver coupled to the electric motor, reflecting current in the driver. Also the coarse control loop logic may be configured to determine if the predetermined electrical current regulation level has been obtained within the tuning control time window and output coarse control loop motor control signals, via the core, to the driver to increase or decrease a fast current decay, in the manner described above.

The fine control loop logic is configured to receive the fine control loop settings and the comparison of the reference predetermined electrical current and the sense signal from the driver, reflecting current in the driver. Also, the fine control loop logic may also be configured to determine if the predetermined electrical current regulation level has been obtained before, after or at a center of the tuning control time window and output fine control loop motor control signals, via the core, to the driver to increment or decrement an amount of fast current decay during the total decay time, in the manner described above.

The electric motor regulation device may be an integrated circuit, such as in which the driver, which may be an H-bridge, may be included in the integrated circuit.

In accordance with embodiments of the present systems and methods, an electric motor system having an electric motor, includes an electric motor driver operatively coupled to the electric motor, with an electric motor regulation device, such as described above is operatively coupled to the driver.

BRIEF DESCRIPTION OF THE DRAWINGS

Having thus described the present systems and methods in general terms, reference will now be made to the accompanying drawings, wherein:

DETAILED DESCRIPTION

The techniques of this disclosure now will be described more fully hereinafter with reference to the accompanying drawings. These techniques may, however, be embodied in many different forms and should not be construed as limited to the embodiments set forth herein. Rather, these embodiments are provided so that this disclosure will be thorough and complete, and will fully convey the scope of this disclosure to those skilled in the art. One skilled in the art may be able to use the various embodiments described herein.

For example, while this disclosure may describe the present systems and methods referring to one specific type of motor, stepper motors, the present systems and methods are not limited to this type of motor. This disclosure describes systems and methods for using conjoined closed loop feedback control to "lock" to an amount of decay required to regulate a motor current, independent of supply voltage, process, temperature, back electromotive force (BEMF), motor load, etc.

Under typical decay control scenarios an unknown amount of current is able to build up in the coil each Pulse Width Modulation (PWM) cycle based on many factors. A fixed decay setting has to be tuned for each individual application and will not be optimized for each holding current level in the motor profile in order to meet all the levels. Coarse adjustments may be made based on the predetermined current regulation level during minimum or outside motor drive time, but eventually a different amount of decay will be needed, with only coarse adjustments this may lead to audio noise present in the system caused by the periodic jumping between coarse levels. The present systems and methods use both coarse and fine adjustment feedback loops to lock to the particular amount of decay needed to regulate any load, holding current, power supply, and time varying BEMF in the system. Thus, audio noise is eliminated by locking to the correct amount of decay with fine adjustments every PWM cycle, in accordance with the present systems and methods.

Figure 1:
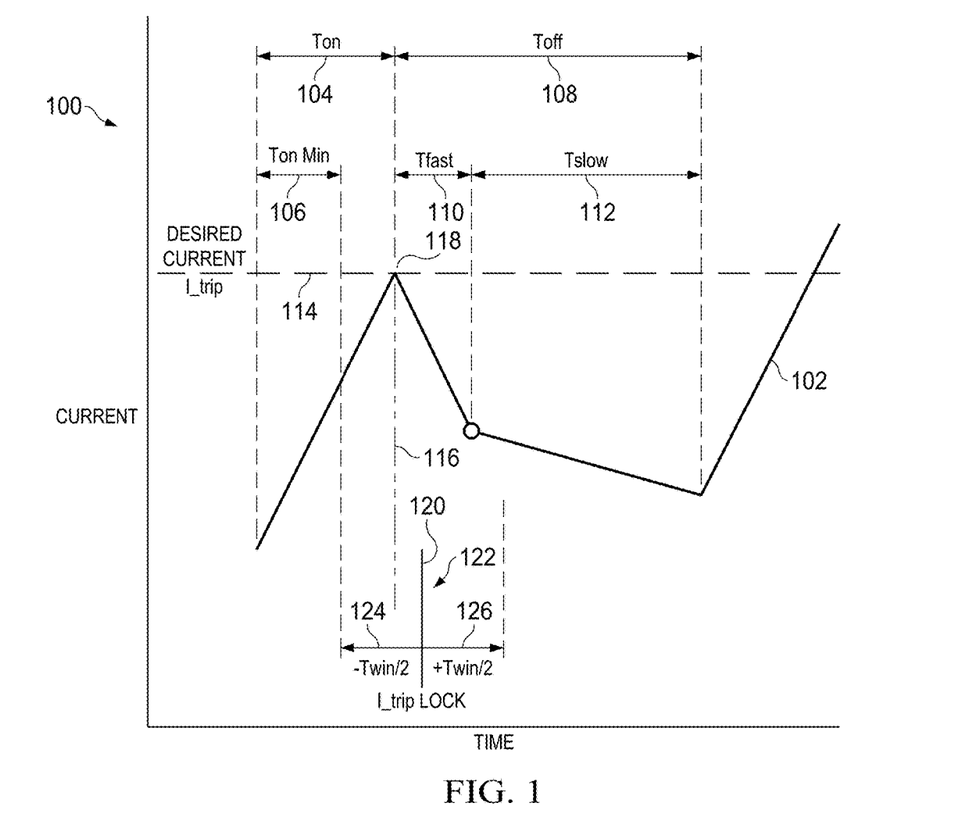
FIG. 1 is a diagram showing timing of motor control events within a Pulse Width Modulation (PWM) cycle, in accordance with some embodiments.

The present systems and methods for time varying current regulation in electric motors may be referred to herein as a decay lock loop (DLL). This decay lock loop automatically and dynamically tunes electric motors (such as stepper motors) for optimal current regulation performance and compensates for motor variation and aging effects. For reference hereinafter, FIG. 1 is a diagram showing (graphing) timing 100 of motor control events within a PWM cycle, in accordance with some embodiments. Therein, motor current is indicated by line 102. Motor drive time (Ton) 104 is shown, which includes minimum motor drive time (Ton_Min) 106. Total current decay time (TOff) 108 may be made-up of fast decay time (Tfast) 110 plus slow decay time 112 (Tslow). The desired, or predetermined, current regulation level (I_trip) is shown by line 114, while the I_trip occurrence time is indicated by line 116 and shown at point 118, and I_trip lock 120 is indicated midway tuning control window (Twin) 122. Tuning control window 122 is split into negative tuning control window (-Twin) 124 and positive tuning control window (+Twin) 126, at trip lock timing 120.

The present systems and methods for time varying current regulation in electric motors employing a decay lock loop takes in a reference, in the form of a time value referred to herein as a tuning control window ("T_window") and imposes a proportional fast/slow (mixed) decay to cause a desired (i.e. a predetermined) current regulation level ("I_trip") to occur after minimum motor drive time (Ton_min), but before expiration of (a last half of) the tuning control window (i.e. during Ton_min plus T_window/2). To this end, the decay lock loop uses both coarse and fine adjustments as described below.

In a traditional fixed decay scheme, fast step response requires aggressive fast decay to make the step response very responsive. However, this leads to large ripple, such as once the step has settled to the final value in "steady state." This and other above-described tradeoffs and limitations with fixed decay schemes may be addressed in accordance with the present systems and methods by a "plug-and-play" implementation that may automatically and dynamically configure an optimal decay scheme, eliminating need for time-consuming tuning. This dynamic scheme may keep adapting to changing parameters in the motor system, such supply voltage, motor characteristics, regulation current, motor speed, BEMF, etc. The present systems and methods de-couple step response and holding behavior, in that what is ideal for faster step response is not necessarily what is ideal for holding current, and vice versa. Thereby, the present decay lock loop automatically (dynamically) and optimally regulates any current regardless of supply voltage variation, load changes, varying BEMF, etc. Additionally, the decay lock loop eliminates audio noise, such as associated with various types of electric motors, due to lower ripple. Further, this low ripple improves efficiency and also makes higher levels of micro-stepping possible.

The present systems and methods are automatically and dynamically tuning mechanisms for decay. This real-time tuning incorporates a decay lock loop, which converges on a preset time for a predetermined current regulation level to occur in a PWM cycle. Once the decay lock loop achieves lock and the time to the predetermined current regulation level is fixed, the subsequent total decay time may be pre-fixed and this ensures that consequent PWM cycle times are the same. By making sure that the PWM cycle times are the same, sub-harmonic oscillations may be avoided and PWM switching activity may be kept above human audible frequencies, making motor operation smooth and significantly quieter.

Figure 2:
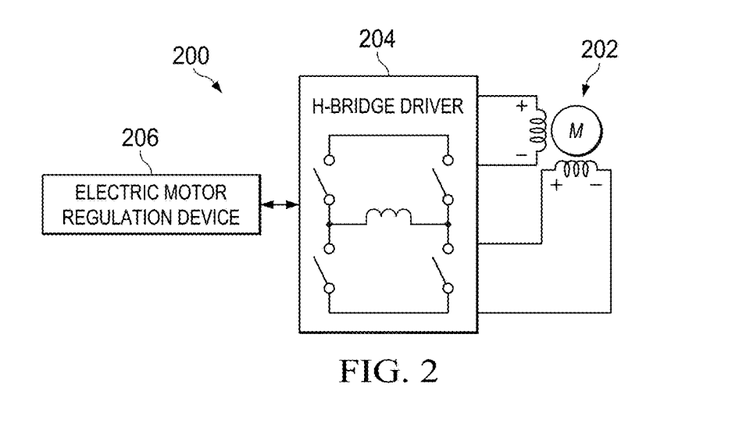
FIG. 2 is a block diagram of an electric motor system employing an embodiment of the present decay lock loop, in accordance with some embodiments.

FIG. 2 is a block diagram of electric motor system 200 employing an embodiment of the present decay lock loop, in accordance with some embodiments. In FIG. 2 electric motor 202 is operatively coupled to electric motor driver 204, which may be an H-bridge, or the like. Such an H-bridge may be, by way of example, an N-channel MOSFET H-bridge. Electric motor regulation device or apparatus 206 is operatively coupled to driver 204. Regulation device 206 may be an an Integrated Circuit (IC) and driver 204, such as the aforementioned H-bridge, may be included in this IC.

Regulation device 206 uses a decay lock loop, in accordance with the present systems and methods to converge to a precise decay solution that makes each and every PWM cycle repeatable. To this end, the decay lock loop employed by regulation device 206 may use two feedback control loops, such as described in greater detail below, with reference to FIGS. 3 and 4. First, a coarse control loop (CCL) that reacts to sudden changes in load current or step change demands. Next, a fine control loop (FCL) gradually fine tunes the fast decay time within a fixed total decay time. The coarse control loop reacts quickly to large changes in load current resulting from mechanical load changes, BEMF, change in current regulation step, or the like. Whereas, the find control loop, because the large steps in the coarse control loop makes it very unlikely that the exact amount of decay will be achieved with only a coarse adjustment enables the present decay lock loop feedback systems and methods to achieve a precise solution, given a reference time.

Figure 3:
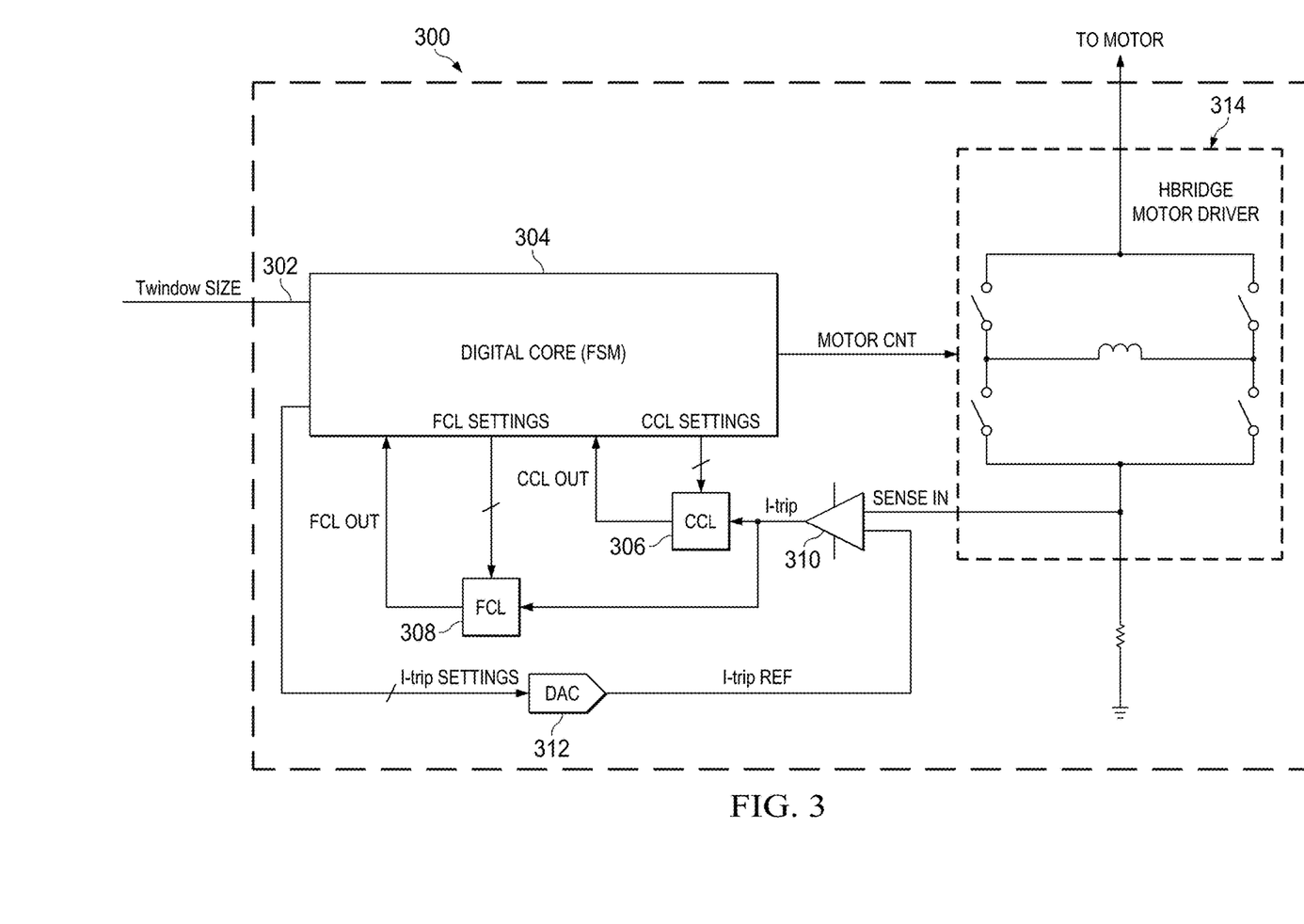
FIG. 3 is a block diagram of an electric motor regulation device employing decay lock loop, in accordance with some embodiments.

FIG. 3 is a block diagram of an electric motor regulation device 300 employing decay lock loop, in accordance with some embodiments. Device or apparatus 300 may be implemented as regulation device 206 of system 200 to provide a decay lock loop for time varying current regulation in electric motor 202. Device 300, which may be an IC, includes input 302 configured to receive input defining a reference time that establishes a tuning control time window size and a total decay time (T_off).

A logic core of device 300, such as illustrated finite state machine digital core 304, is configured to receive the input defining the tuning control time window size, and in accordance with various embodiments inputs such as a total decay time, and to output coarse control loop settings to coarse control loop logic 306, which may be separate from, or a part of, core 304. The coarse control loop settings may be based, at least in part, upon the input tuning control time window size. Core 304 is also configured to output fine control loop settings to fine control loop logic 308, which may also be separate from, or a part of, core 304. The fine control loop settings may be based, at least in part, upon the input tuning control time window size.

Core 304 may also be configured to output a reference indicative of a predetermined (i.e. desired) electrical current regulation level (I_trip) for the subject electric motor (202) to comparator 310, such as via Digital to Analog Converter (DAC) 312. That is, the reference I_trip may be a digital signal that is converted to an analog current by DAC 312 for use by comparator 310 to compare to a sense signal from the driver, reflecting current in the driver. The reference I_trip may be based, at least in part, on the input tuning control time window.

Coarse control loop logic 306 is configured to receive the coarse control loop settings from core 304 and the comparison of the reference I_trip and the sense signal from the driver, reflecting current in the driver (i.e. current in MOSFET switches of driver 314). Coarse control loop logic 206 may determine if a predetermined (or desired) I_trip for the subject electric motor (202) has been obtained within the input tuning control time window. Coarse control loop logic 206 continues determining if the predetermined I_trip has been obtained within the tuning control time window. In response to a determination that the predetermined I_trip has not been obtained within the tuning control time window, coarse control loop logic 206 outputs coarse control loop motor control signals, via core 304 to driver 314 to increase or decrease a fast current decay, until the predetermined I_trip falls within the tuning control time window. Thereafter, coarse control loop logic 206 may continue monitoring to ensure the predetermined I_trip is maintained within the tuning control time window.

Fine control loop logic 308 is configured to receive the fine control loop settings from core 304 and the comparison of the reference I_trip and the sense signal from the driver, reflecting current in the driver. Fine control loop logic 308 may also determine if the the predetermined (or desired) I_trip for the subject electric motor has been obtained within the input tuning control time window. In response to a determination that the predetermined I_trip has been obtained within the tuning control time window (such as through implementation of the coarse control loop) fine control loop logic 308 outputs fine control loop motor control signals, via core 304 to driver 314 to increment or decrement an amount of fast decay during the total decay time, until a predetermined timing of the predetermined I_trip (such as may be established employing the input T_window size) has been obtained. Thereafter, fine control loop logic 308 may continue monitoring to ensure the predetermined I_trip timing is maintained.

Figure 4:
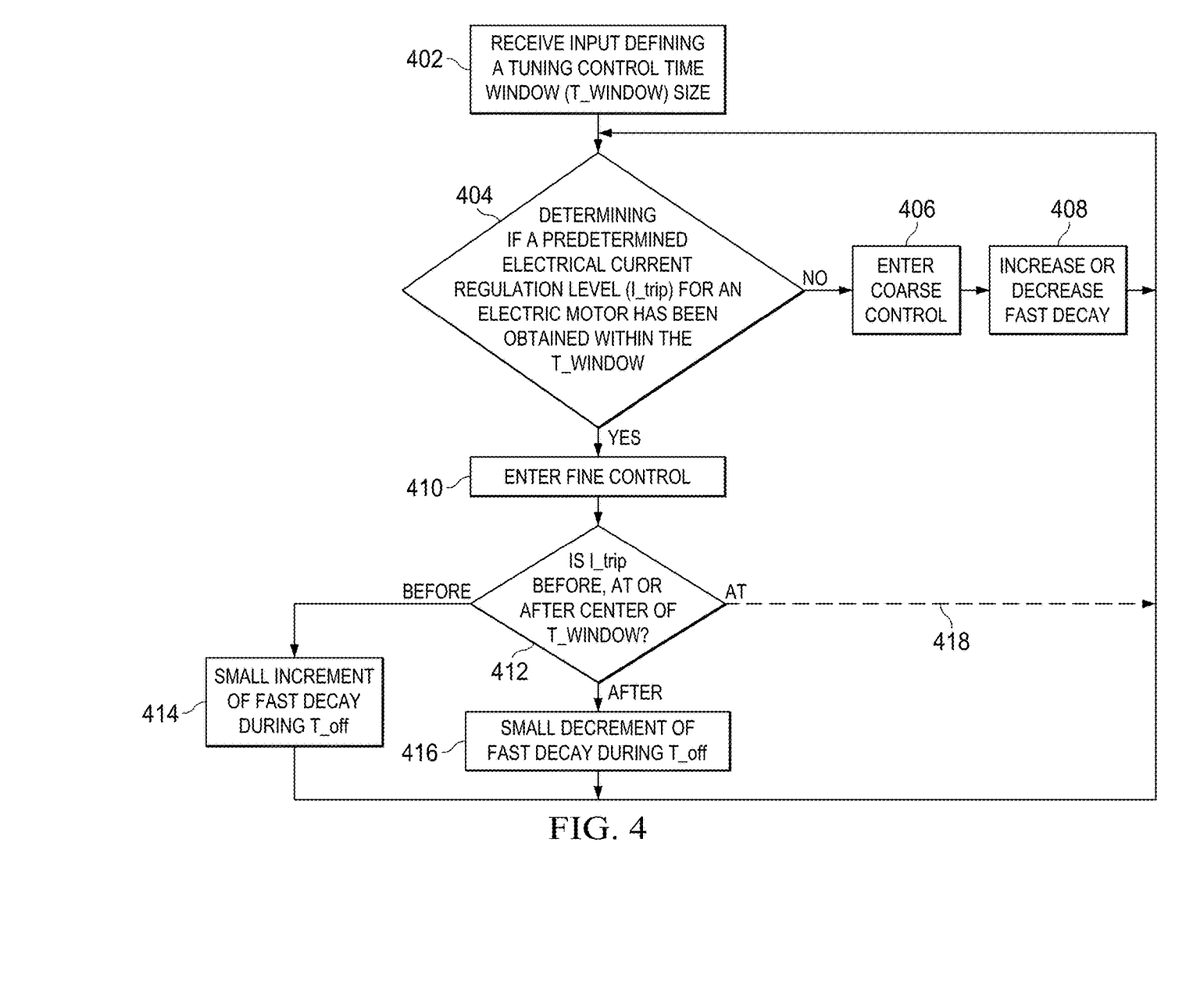
FIG. 4 is a flowchart of an example implementation of a process for providing decay lock loop time varying current regulation for an electric motor, according to some embodiments.

The incrementing or decrementing of an amount of fast current decay until a predetermined timing (T_window/2) of the predetermined electrical current regulation level (I_trip) has been obtained may entail determining if the predetermined timing of I_trip has been obtained in a center of T_window. The amount of fast current decay may be incremented or decremented during T_off, until I_trip has been obtained at T-window/2 (a center of the tuning control time window). In particular, it may be determined if I_trip has been obtained before, after or at a center of the T_window. Whereupon, if I_trip has been obtained before the center of the T_window, the amount of fast current decay is incremented during the total decay time, and if I_trip has been obtained before the center of the T_window, the amount of fast current decay may be decremented during the total decay time FIG. 4 is a flowchart of example implementation 400 of a process for providing decay lock loop time varying current regulation for an electric motor, according to some embodiments. Therein, a tuning control time window setting is received at 402. This tuning control window may extend from an end of a minimum drive time window for the electric motor to twice the time to a desired I_trip timing.

In accordance with the present systems and methods, a coarse control loop (CCL) decouples the tradeoff in a traditional fixed decay scheme of ripple versus step response. This coarse loop monitors to determine if the predetermined current regulation level (I_trip) happens within the minimum motor drive time and if it does then the coarse loop may increase (or decrease) the fast decay in progressively more aggressive ratios of fast decay until the predetermined current regulation level no longer falls within the minimum motor drive time. By extension, increasing the fast decay reduces the amount of slow decay and decreasing the fast decay increases the amount of slow decay.

Hence, at 404 a determination is made whether a predetermined or desired electrical current regulation level for an associated electric motor has been obtained within this predefined tuning control time window. This determination may include determining if the predetermined or desired electrical current regulation level has been obtained outside the tuning control time window.

In response to a determination at 404 that the predetermined or desired electrical current regulation level has not been obtained within the tuning control time window, a coarse control loop is entered into at 406 and fast current decay for controlling the motor is increased or decrease at 408 in relatively coarse steps. Correspondingly slow decay is reduced or increased with the increasing or decreasing the fast decay, respectively. As noted, this increase or decrease of the fast current decay may include progressively increasing or decreasing more aggressive ratios of fast decay to slow decay until the predetermined or desired electrical current regulation level occurs inside the tuning control time window. The overall increase or decrease in fast decay at 408 continues until the the predetermined or desired electrical current regulation level for the electric motor has been obtained within the tuning control time window, as determined at 404.

These fast decay steps are large in nature, hence the term "coarse control loop." The coarse control loop will progress the motor system into an approximation of a locked solution state, but the coarse control loop may not, in accordance with the present systems and methods, be enough on its own to reach a steady state. Therefore, a fine control loop (FCL) may be employed, in accordance with the present systems and methods, such as following implementation of the coarse control loop. Given that the fast decay adjustment steps are large in the coarse control loop it is unlikely that an exact amount of decay will be achieved with only a coarse adjustment.

Hence, at 410 a fine control loop is entered into in response to a determination at 404 that the predetermined or desired electrical current regulation level has been obtained within the tuning control time window defined at 402. Therein, at 412 a determination is made as to whether the I_trip is occurring at, before or after the center of the tuning control time window (T_window) and hence at the predetermined or desired I_trip timing. An amount of fast decay is incremented a small amount at 414, during the T_off, in response to a determination at 412 that the I_trip is occurring before the center of the T_window. The amount of fast decay is decremented a small amount at 416, during the T_off, in response to a determination at 412 that the I_trip is occurring after the center of the T_window. This incrementing or decrementing an amount of fast decay correspondingly results in decrementing or incrementing slow decay, respectively. Incrementing or decrementing the fast decay during the total decay time at 414 or 416 may also be carried out as a result of a disturbance (disruption) in the predetermined or desired electrical current regulation level, such as may be determined at 404 and/or 412.

If it is found at 412 that the I_trip is occurring at the center of the T_window, and hence at the defined (predetermined or desired) timing the fast decay, the timing is obtained. This timing may, in some embodiments, be insured, i.e. is maintained, via 418, by returning control control to 404 for a determination that the I_trip is being maintained in the T_window and subsequently to 412 to determine that the I_trip is continuing to occur at the predetermined or desired timing.

Regardless, control returns to 404 from fast decay incrementing 414 and decrementing 416 for a determination that the I_trip is still being maintained in the T_window and subsequently to 412 to determine if the I_trip is occurring at the predetermined or desired timing (i.e. at the center of the T_window).

Thereby, the fine control loop initiated at 410 uses the tuning control window as defined at 402 and in place from the course control loop, which is in time after the minimum motor drive time. The fine control loop through steps 412 through 416 places the I_trip within the timing control window, at the center of the timing control window. That is, the fine control loop constrains the predetermined current regulation level to occur after the minimum motor drive time, at a predetermined timing (i.e. at Ton_min plus T_window/2) of the predetermined (desired) electrical current regulation level (fine adjustment setting), by incrementing or decrementing the amount of fast decay in the total decay time (T_off (fixed motor time off)) time. By extension, incrementing the fast decay reduces the amount of slow decay during the total decay time and decrementing the fast decay increases the amount of slow decay during the total decay time. As noted, this fine adjustment occurs after the coarse setting has been found. The fine control loop will continue to increment or decrement until the predetermined current regulation level occurs within, by way of example, one Least Significant Bit (LSB) of the fine adjustment. At that time the fine control loop will alternate back and forth between one LSB of increment and decrement around an ideal decay amount. At this time, decay lock loop has reached a decay lock condition and a steady state.

Use of a fine control loop in conjunction with the coarse control loop enables the the present decay lock loop feedback systems and methods to achieve an accurate solution given a reference time. However, in the coarse control loop, each coarse setting should have sufficient range to overlap with a previous and next coarse setting, such that the fine adjustment setting (i.e. the predetermined current regulation level) may be found during the fine control loop.

If a disruption in the decay lock occurs, such as may be determined at 404 (and/or 412), the decay lock loop will automatically and dynamically adjust by changing the fast decay through incrementing and/or decrementing until the decay lock is again reestablished. If the predetermined current regulation level occurs outside of the tuning control window then the decay lock loop will implement a coarse adjustment and will increase or decrease the fast decay, depending on the nature of the loop conditions. After the coarse adjustment the fine control loop will again establish the decay lock, as described above.

Use of a decay lock loop in accordance with the present systems and methods will automatically and dynamically adjust a decay scheme based on operating factors such as motor winding resistance and inductance, motor aging effects, motor dynamic speed and load, motor supply voltage variations, motor BEMF difference on rising and falling steps, step transitions, low-current versus high-current (i.e. changes in current over a change in time), etc.

Thus, use of a decay lock loop in accordance with the present systems and methods greatly simplifies decay mode selection by automatically and dynamically configuring the decay mode between slow, mixed, and fast decay. In mixed decay, the decay lock loop dynamically adjusts the fast decay percentage of the total mixed decay time. This eliminates need for motor tuning, by automatically and dynamically determining the best decay setting that results in the lowest ripple for the motor. The decay mode setting is optimized iteratively each PWM cycle. If the motor current overshoots the target trip current level (i.e. predetermined electrical current regulation level), then the decay mode becomes more aggressive (adds fast decay percentage) on the next cycle in order to prevent regulation loss. If there is a long drive time to reach the target trip level, the decay mode becomes less aggressive (removes fast decay percentage) on the next cycle in order to operate with less ripple and more efficiently. On falling steps, the decay lock loop may automatically and dynamically switch to fast decay in order to reach the next step quickly.

A resulting advantage of the present systems and methods is implementation in a user-friendly manner, such that an end user, end-product manufacturer, installer, technician, or the like may turn on decay lock loop current regulation and it will control decay regardless of external factors. In contrast, selecting a "correct" setting in previous implementations was a time consuming trial-and-error process. Prior solutions do not use a decay lock loop, such as employed in accordance with the present systems and methods, incorporating negative feedback, such that the current is locked to a steady state condition.

Figure 5:
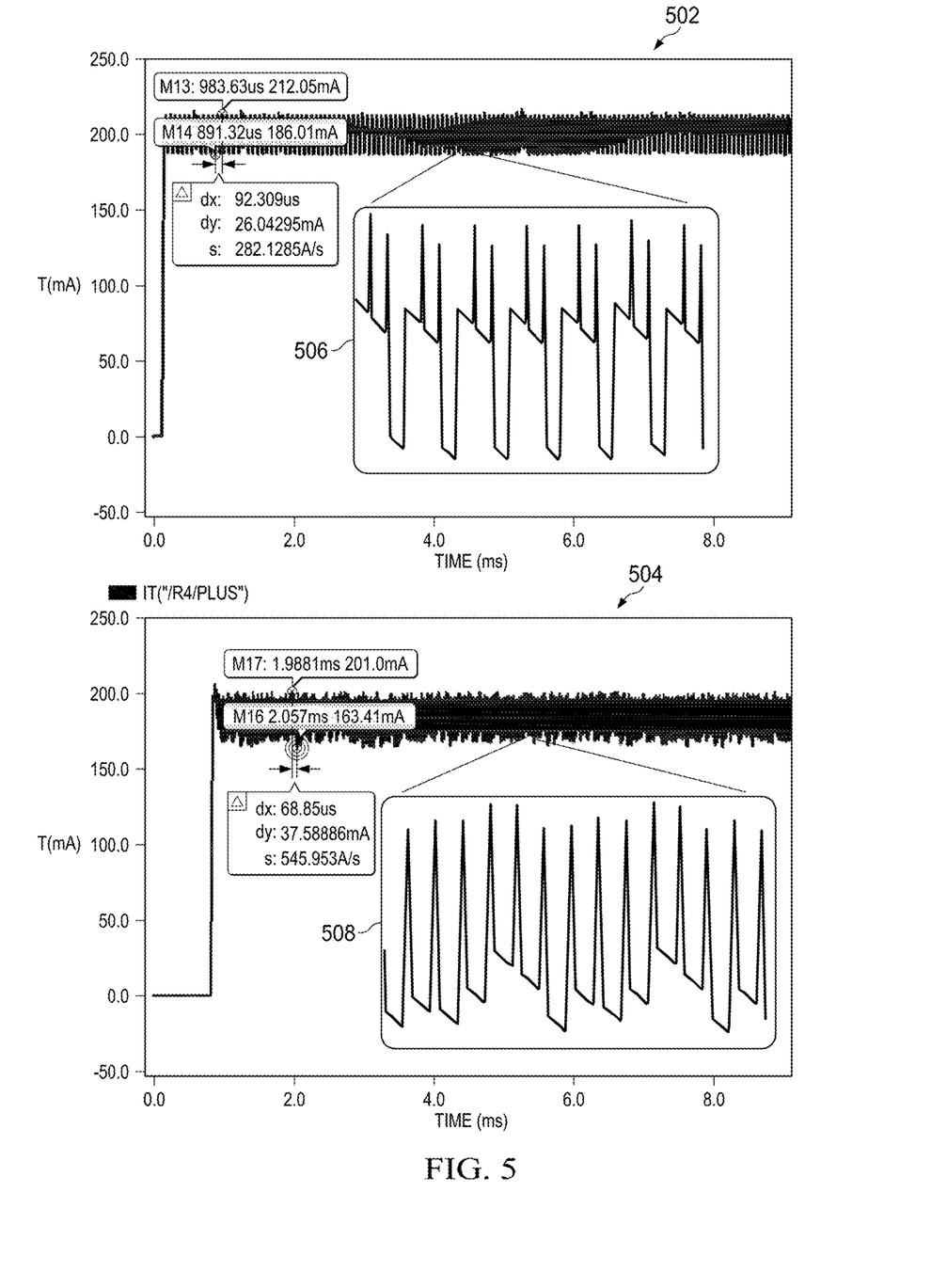
FIG. 5 is a comparison of graphs/plots of current over time in a steady state, in accordance with some embodiments.
Figure 6:
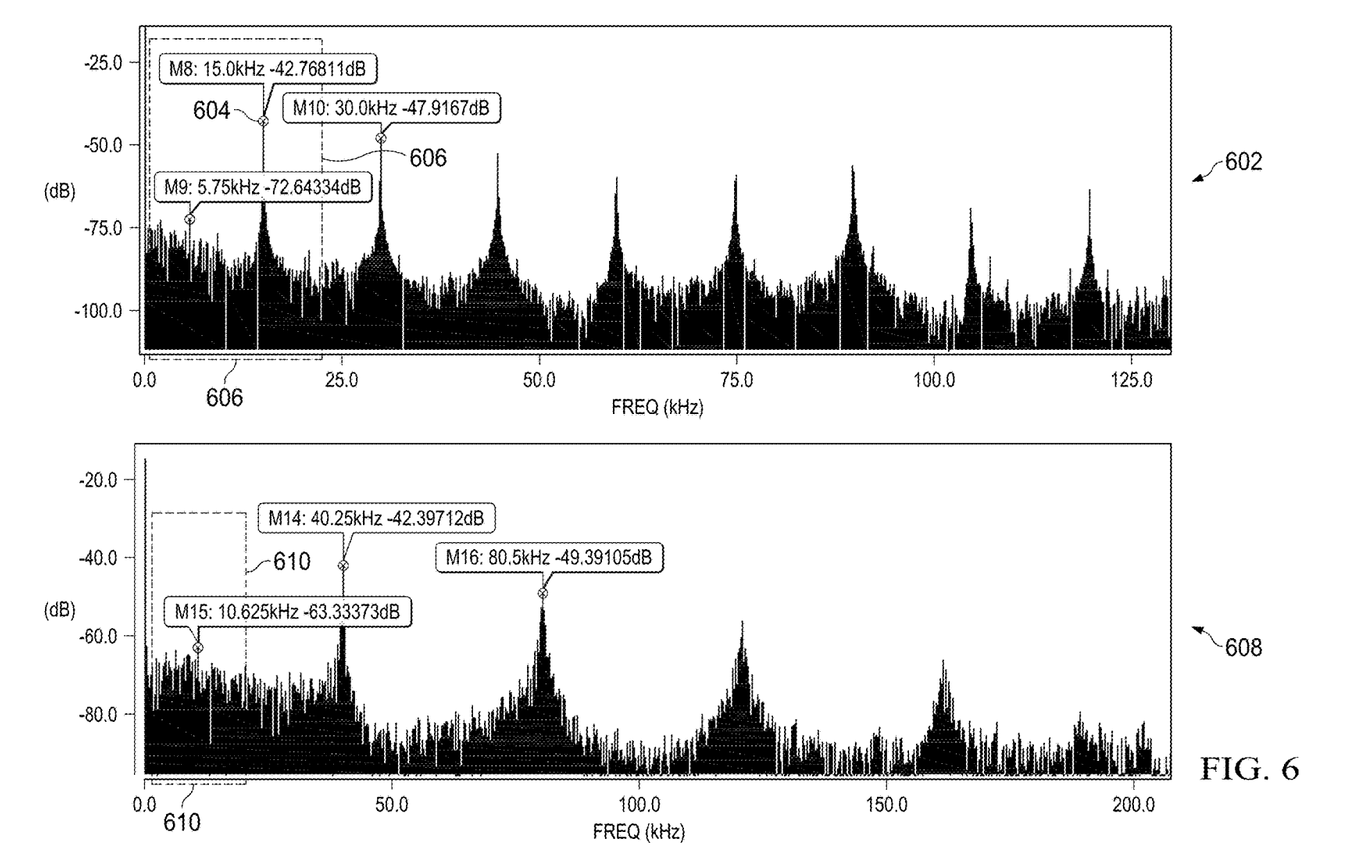
FIG. 6 is a comparison of graphs/plots of sound pressure (dB) at produced frequencies in a steady state, in accordance with some embodiments.

Another advantage of the present systems and methods for a decay lock loop hereunto described is it is constantly updating the decay needed to lock the system current regulation. This has an effect of not allowing a limit cycle to be produced. If a repeatable pattern that is many PWM cycles long an audible tone, it may be produced in the spectrum that is heard by the human ear. This audible tone is sometimes referred to as sub-harmonic oscillation. The decay lock loop is, in accordance with the present systems and methods, constantly adjusting the decay settings every PWM cycle to stay in the steady state lock condition. This limits the ability of the sub-harmonic oscillation phenomenon from occurring. FIGS. 5 and 6 are plots showing sub-harmonics, in a human-audible band, and how the sub-harmonics are eliminated by using a decay lock loop in accordance with the present systems and methods.

FIG. 5 is a comparison of plots 502 and 504 of current over time in a steady state, in accordance with some embodiments. Therein, plots 502 and 504 of current over time in a steady state may be compared. Plot 502 shows only a discrete decay solution (i.e. a course control with no fine control decay lock loop) and may be compared to a steady state with both a coarse control loop and a fine control loop active shown in plot 504. FIG. 5 illustrates the difference when a fine control loop is employed once a coarse control loop has been used. Waveform 506, wherein only coarse control (no fine control) is employed, demonstrates a back-and-forth jump between coarse steps, which causes large sub-harmonic oscillations. Conversely, waveform 508, wherein fine control is enabled, shows less cycle to cycle variation and thus causes lower sub-harmonic oscillations.

FIG. 6 is a comparison of plots 602 and 604 of sound pressure (dB) at produced frequencies in a steady state, in accordance with some embodiments. Therein, plot 602 shows sound pressure (dB) at produced frequencies in a steady state with only a discrete decay solution (i.e. no decay lock loop). Plot 604 may be compared in a steady state with both a coarse control loop and a fine control loop active, as shown in plot 604. For example, it may be seen that in plot 602, if only typical discrete decay solutions are employed, example spur 606 is present in audible band 608, and sound pressure is generally greater at audible frequencies. In plot 604 it may be seen that in steady state 608 under the present systems and methods employing a decay lock loop no spurs are present in audible band 610, and sound pressure is generally lower at audible frequencies.

Figure 7:
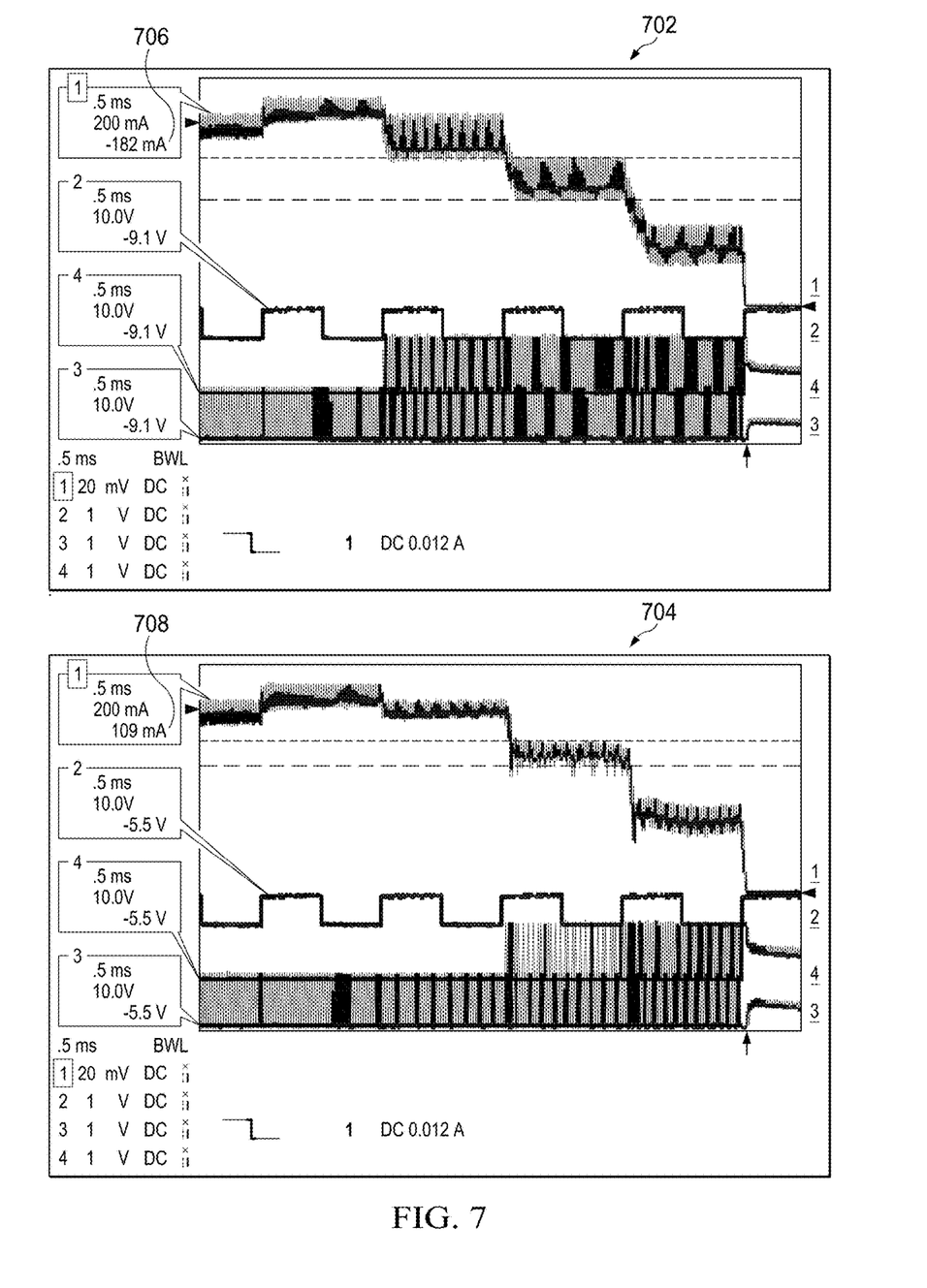
FIG. 7 is a comparison of a plot of fixed fast decay amperage ripple and plot of decay lock loop amperage ripple, in accordance with some embodiments.

The present systems and methods for a decay lock loop for time varying current regulation in electric motors provide lower ripple when compared to tuned fixed decay schemes. FIG. 7 is a comparison of plot 702 of fixed fast decay amperage ripple and plot 704 of decay lock loop amperage ripple, in accordance with some embodiments of the present systems and methods. In plot 702, a fixed mix decay setting of 25% results in a 182 mA ripple (706). Conversely, in plot 704, decay lock loop in accordance with the present systems and methods keeps the average ripple at 109 mA (708). Hence, embodiments of the present systems and methods employing a decay lock loop exhibits lower ripple when compared to tune fixed decay schemes. That is, by converging to a decay solution that tends towards maximizing the use of slow decay time in any given PWM cycle, ripple is minimized. Further, the present systems and methods employing a decay lock loop are more power efficient as demonstrated by the use of lower amperage current in the examples of FIG. 7.

Figure 8:
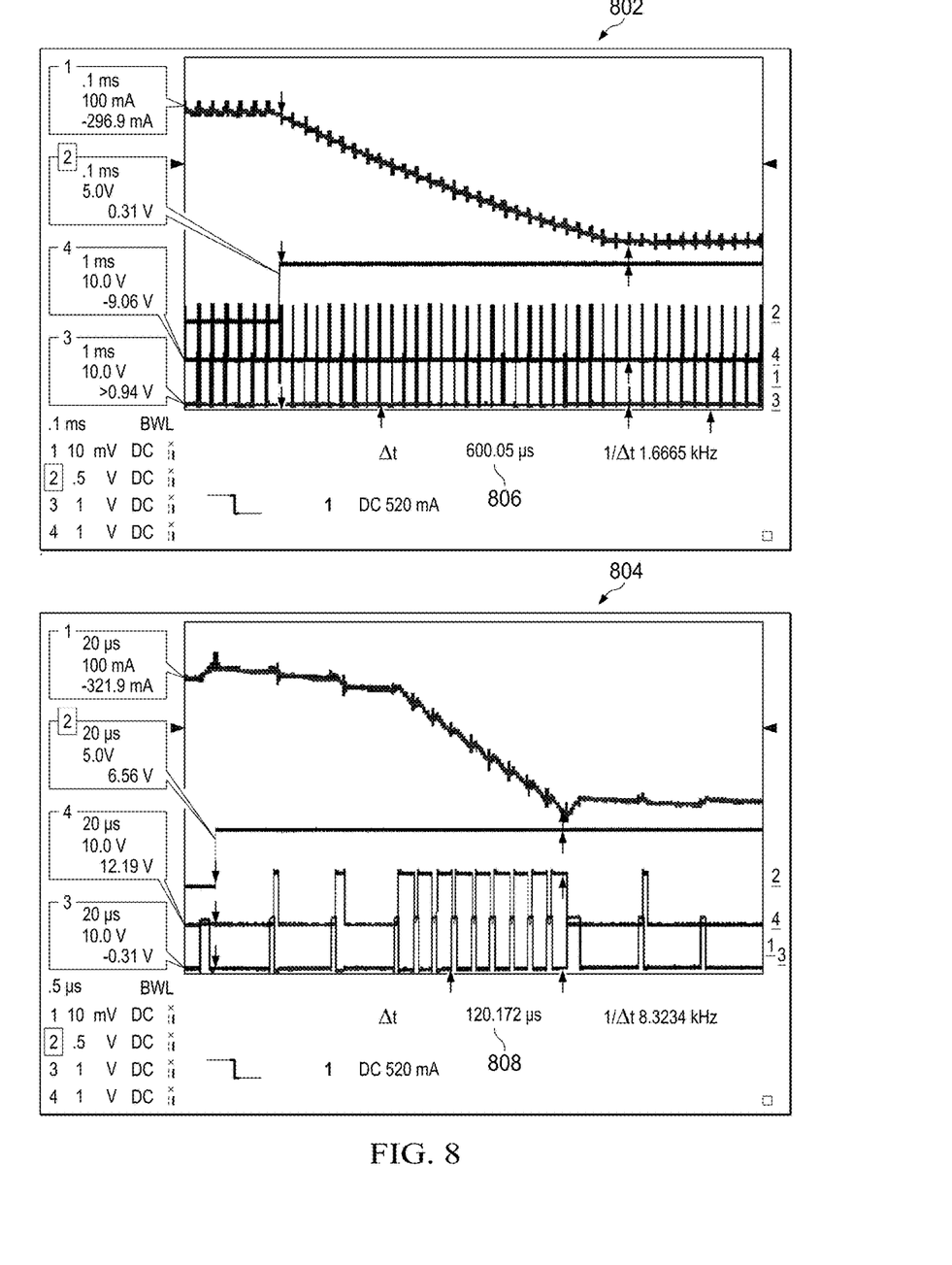
FIG. 8 is a comparison of a fixed fast decay step transition and a step response under a decay lock loop, in accordance with some.

Decay lock loops used in accordance with the present systems and methods quickly adapt to a higher level of fast decay, such as in response to a step command input. This provides for a quick step transition response. Once the step transition is complete fast decay is scaled back in accordance with the present systems and methods under a decay lock loop to ensure low ripple performance. FIG. 8 is a comparison of plot 802 of a fixed fast decay step transition and plot 804 of a step response under a decay lock loop, in accordance with some embodiments of the present systems and methods. In plot 802 a fixed fast decay of 15% takes 600 uS for a step transition (806), whereas in plot 804 the decay lock loop of the present systems and methods enable a step response in 120 uS (808).

Figure 9:
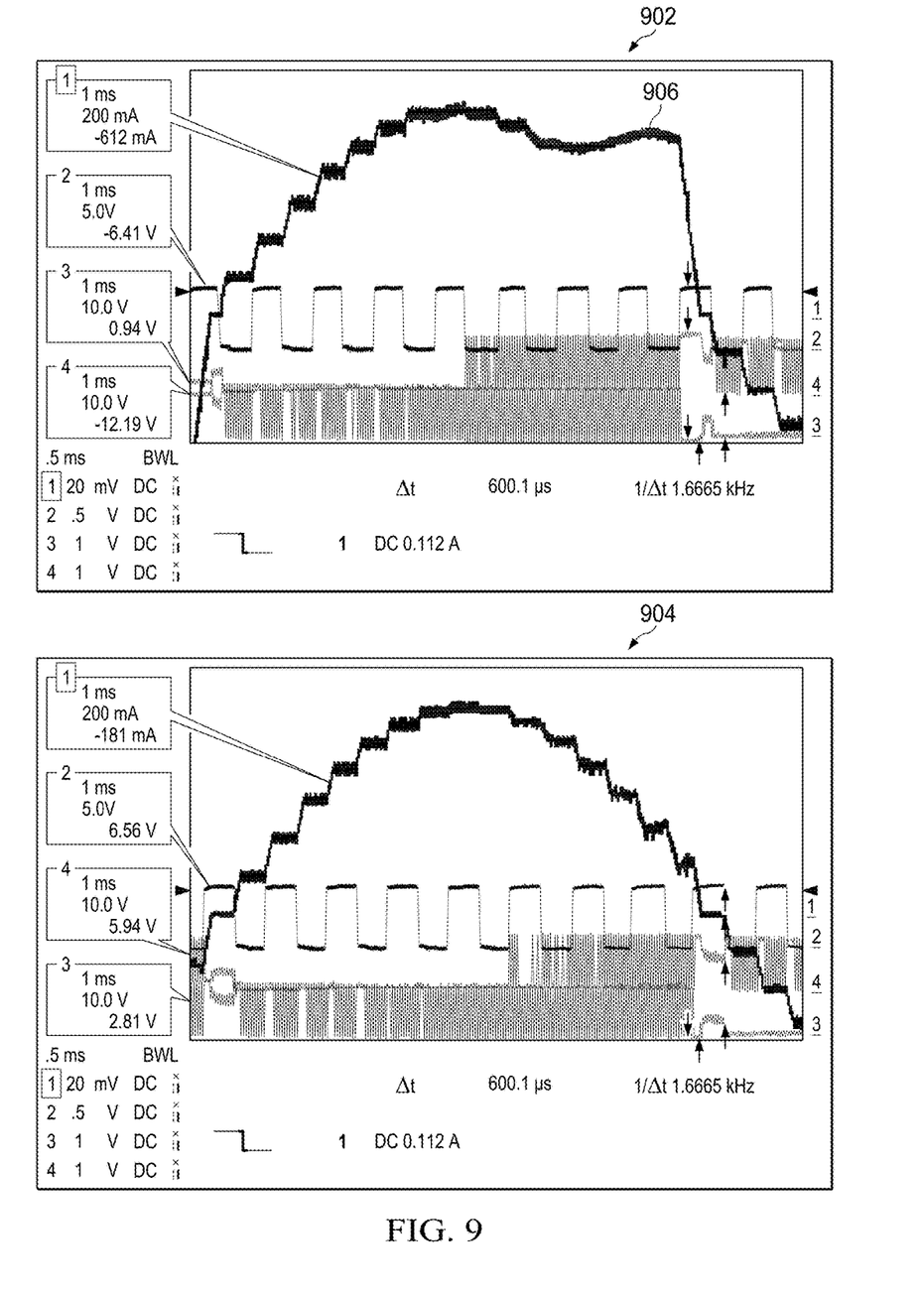
FIG. 9 is a comparison of a plot of loss of current regulation due to back electromotive force (BEMF) when fixed decay is employed, versus a plot of maintenance of current regulation when a decay lock loop is employed, in accordance with some embodiments.

Spinning motors may create back electromotive force (BEMF), which may disrupt current regulation. Employing a decay lock loop in accordance with embodiments of the present systems and methods dynamically corrects for BEMF and maintains steady current regulation. FIG. 9 is a comparison of plot 902 of loss of current regulation due to BEMF when fixed decay is employed, versus plot 904 of maintenance of current regulation when a decay lock loop is employed, in accordance with some embodiments of the present systems and methods. Therein, a loss of regulation due to BEMF when a fix decay of 15% is employed is shown in plot 902, at 906. Whereas, plot 904 shows a decay lock loop employed in accordance with the present systems and methods changes decay in cycles affected by BEMF to maintain current regulation throughout.

Figure 10:
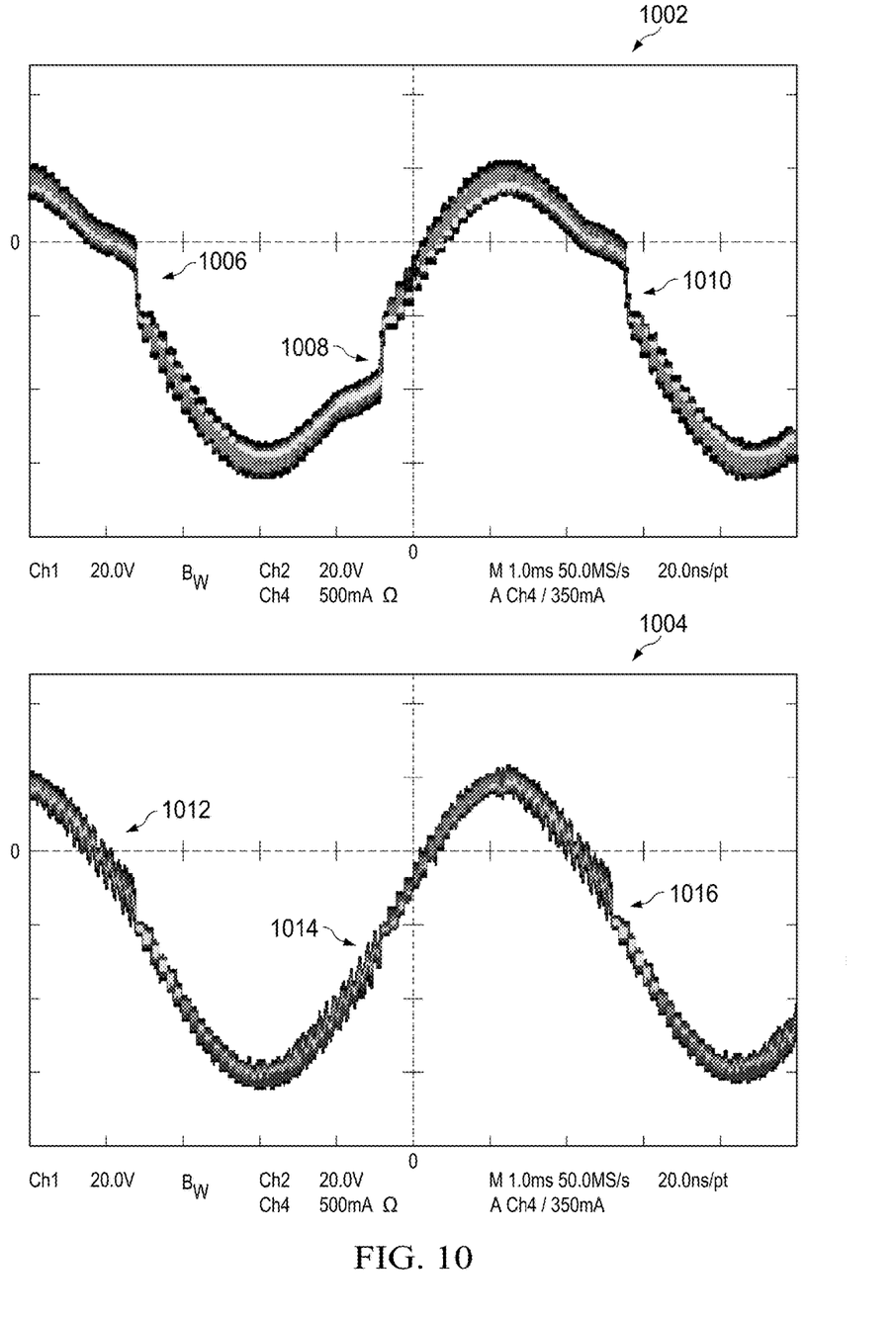
FIG. 10 is a comparison of micro-stepping current profiles under fixed decay and under a decay lock loop, in accordance with some embodiments.

Employing decay lock loops in accordance with the present systems and methods affords an enhanced ability to regulate small currents. The decay lock loop tunes to an optimal decay solution for both large and small currents. FIG. 10 is a comparison of sinusoidal micro-stepping current profiles 1002 and 1004, under fixed decay and under a decay lock loop, respectively, in accordance with some embodiments of the present systems and methods. Therein, in profile 1002, distortion at 1006, 1008 and 1010 may be seen when a fixed fast decay of 30% is used, because the subject motor system is unable to regulate the small currents, which results in distortion, near zero-crossing. Whereas, in profile 1004, minimal distortion is seen in corresponding areas 1012, 1014 and 1016, near zero-crossing, when a decay lock loop is employed in accordance with the present systems and methods, because the decay lock loop dynamically determines the correct decay for both small and large currents.

Many modifications and other embodiments will come to mind to one skilled in the art to which this disclosure pertains having the benefit of the teachings presented in the foregoing descriptions, and the associated drawings. Therefore, it is to be understood that the techniques of this disclosure are not to be limited to the specific embodiments disclosed. Although specific terms are employed herein, they are used in a generic and descriptive sense only and not for purposes of limitation.

What is claimed is:

1. A method for time varying current regulation in an electric motor comprising:
   determining if a predetermined electrical current regulation level for an electric motor has been obtained within a tuning control time window;
   increasing or decreasing a fast current decay, in response to a determination that the predetermined electrical current regulation level has not been obtained within the tuning control time window, until the predetermined electrical current regulation level falls within the tuning control time window; and
   incrementing or decrementing an amount of fast current decay during a total decay time for the electric motor, in response to a determination that the predetermined electrical current regulation level has been obtained within the tuning control time window, until a predetermined timing of the predetermined electrical current regulation level has been obtained.

2. The method of claim 1, wherein incrementing or decrementing an amount of fast current decay until a predetermined timing of the predetermined electrical current regulation level has been obtained further includes:
   determining if the predetermined timing of the predetermined electrical current regulation level has been obtained in a center of the tuning control time window; and
   incrementing or decrementing the amount of fast current decay during the total decay time for the electric motor, until the predetermined electrical current regulation level has been obtained in a center of the tuning control time window.

3. The method of claim 1, wherein incrementing or decrementing an amount of fast current decay until a predetermined timing of the predetermined electrical current regulation level has been obtained further includes:
   determining if the predetermined electrical current regulation level has been obtained before, after or at a center of the tuning control time window;
   incrementing the amount of fast current decay during the total decay time for the electric motor if the predetermined electrical current regulation level has been obtained before the center of the tuning control time window; and
   decrementing the amount of fast current decay during the total decay time for the electric motor if the predetermined electrical current regulation level has been obtained before the center of the tuning control time window.

4. The method of claim 1, in which the tuning control window extends from an end of a minimum drive time window.

5. The method of claim 1, in which increasing or decreasing the fast current decay until the predetermined electrical current regulation level falls within the tuning control time window includes progressively increasing or decreasing more aggressive ratios of fast current decay to slow current decay until the predetermined electrical current regulation level occurs within the tuning control time window.

6. The method of claim 1, further including reducing or increasing slow current decay, correspondingly with the increasing or decreasing the fast current decay until the predetermined electrical current regulation level falls within the tuning control time window and decrementing or incrementing slow current decay during the total decay time, correspondingly with the incrementing or decrementing an amount of fast current decay during the total decay time.

7. The method of claim 1, further including further incrementing or decrementing the fast current decay during the total decay time, in response to a disruption of the timing of the predetermined electrical current regulation level, until the predetermined timing of the predetermined electrical current regulation level has been re-obtained.

8. An electric motor regulation device comprising:
   an input configured to receive input defining a tuning control time window size;
   a digital core configured to:
      receive the input defining the tuning control time window size;
      output coarse control loop settings to a coarse control loop logic based on the tuning control time window size;
      output fine control loop settings to a fine control loop logic based on the tuning control time window size; and
      output a reference predetermined electrical current, based on the tuning control time window size;
   the coarse control loop logic is configured to:
      receive the coarse control loop settings and a comparison of the reference predetermined electrical current and a sense signal from a driver coupled to the electric motor, reflecting current in the driver a driver;
      determine if a predetermined electrical current regulation level has been obtained within the tuning control time window; and
      output coarse control loop motor control signals, via the core, to the driver to increase or decrease a fast current decay, in response to a determination that the predetermined electrical current regulation level has not been obtained within the tuning control time window, until the predetermined electrical current regulation level falls within the tuning control time window;
   the fine control loop logic is configured to:
      receive the fine control loop settings and the comparison of the reference predetermined electrical current and the sense signal from the driver, reflecting current in the driver;
      determine if a predetermined electrical current regulation level has been obtained before, after or at a center of the tuning control time window; and
      output fine control loop motor control signals, via the core, to the driver to increment or decrement an amount of fast current decay during total decay time for the motor, in response to a determination that the predetermined electrical current regulation level has been obtained before or after a center of the tuning control time window, respectively, until a predetermined timing of the predetermined electrical current regulation level has been obtained at a center of the tuning control time window.

9. The device of claim 8, in which the device is an integrated circuit and in which the driver is a part of the integrated circuit.

10. The device of claim 9, in which the driver is an H-bridge.

11. The device of claim 8, in which the tuning control window extends from an end of a minimum drive time window.

12. The device of claim 8, in which the coarse control loop logic is further configured to increase or decrease the fast current decay until the predetermined electrical current regulation level falls within the tuning control time window by progressively increasing or decreasing more aggressive ratios of fast current decay to slow current decay until the predetermined electrical current regulation level occurs within the tuning control time window.

13. The device of claim 8, in which the coarse control loop logic is further configured to reduce or increase slow current decay correspondingly with the increase or decrease of the fast current decay, and to decrement or increment slow current decay correspondingly with the increment or decrement of the amount of fast current decay during the total decay time.

14. An electric motor system comprising:
an electric motor;
an electric motor driver operatively coupled to the electric motor; and
an electric motor regulation device operatively coupled to the driver, the regulation device including:
  an input configured to receive input defining a tuning control time window size;
  a digital core configured to:
    receive the input defining the tuning control time window size;
    output coarse control loop settings to a coarse control loop logic based on the tuning control time window size;
    output fine control loop settings to a fine control loop logic based on the tuning control time window size; and
    output a reference predetermined electrical current, based on the tuning control time window size;
  the coarse control loop logic configured to:
    receive the coarse control loop settings and a comparison of the reference predetermined electrical current and a sense signal from the driver, reflecting current in the driver;
    determine if a predetermined electrical current regulation level has been obtained within the tuning control time window; and
    output coarse control loop motor control signals, via the core to the driver to increase or decrease a fast current decay, in response to a determination that the predetermined electrical current regulation level has not been obtained within the tuning control time window, until the predetermined electrical current regulation level falls within the tuning control time window;
  the fine control loop logic configured to:
    receive the fine control loop settings and the comparison of the reference predetermined electrical current regulation level and a sense signal from the driver, reflecting current in the driver;
    determine if a predetermined electrical current regulation level has been obtained before, after or at a center of the tuning control time window; and
    output fine control loop motor control signals, via the core to the driver to increment or decrement an amount of fast current decay during a total decay time for the motor, in response to a determination that the predetermined electrical current regulation level has been obtained before or after a center of the tuning control time window, respectively, until a predetermined timing of the predetermined electrical current regulation level has been obtained at a center of the tuning control time window.

15. The system of claim 14 in which the electric motor regulation device is an integrated circuit.

16. The system of claim 15, in which the driver is included in the integrated circuit.

17. The system of claim 16, in which the driver is an H-bridge.

18. The system of claim 14, in which the tuning control window extends from an end of a minimum drive time window.

19. The system of claim 14 in which the coarse control loop logic is further configured to increase or decrease the fast current decay until the predetermined electrical current regulation level falls within the tuning control time window by progressively increasing or decreasing more aggressive ratios of fast current decay to slow current decay until the predetermined electrical current regulation level occurs within the tuning control time window.

20. The system of claim 14, in which the coarse control logic is further configured to reduce or increase slow current decay correspondingly with the increase or decrease of the fast current decay, and to decrement or increment slow current decay correspondingly with the increment or decrement of the amount of fast current decay during the total decay time.

* * * * *